(12) United States Patent
Hwang et al.

(10) Patent No.: US 8,859,911 B2
(45) Date of Patent: Oct. 14, 2014

(54) TOUCH PANEL COMPRISING CONDUCTIVE PATTERN

(71) Applicant: LG Chem, Ltd., Seoul (KR)

(72) Inventors: Ji Young Hwang, Daejeon (KR); In-Seok Hwang, Daejeon (KR); Hyeon Choi, Daejeon (KR); Seung Heon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/973,846

(22) Filed: Aug. 22, 2013

(65) Prior Publication Data

US 2014/0092323 A1 Apr. 3, 2014

Related U.S. Application Data

(63) Continuation of application No. PCT/KR2012/007800, filed on Sep. 27, 2012.

(30) Foreign Application Priority Data

Sep. 27, 2011 (KR) .................. 10-2011-0097753

(51) Int. Cl.
*H05K 1/09* (2006.01)
*G06F 3/041* (2006.01)

(52) U.S. Cl.
CPC ..................................... *G06F 3/041* (2013.01)
USPC ............ 174/257; 174/261; 174/255; 345/173

(58) Field of Classification Search
CPC .......... H01L 2924/01078; H01L 2924/01079; H01L 2924/3011; H05K 1/111; H05K 1/112; H05K 1/092; H05K 1/095; H05K 1/0306; H05K 3/3452; H05K 3/244; H05K 3/0052; H05K 2201/09781; G06F 3/0488; G06F 3/04883; G06F 3/044; G06F 3/04886; G06F 3/045
USPC .......... 174/250, 253, 255, 257, 261; 345/173, 345/174
See application file for complete search history.

(56) References Cited

U.S. PATENT DOCUMENTS

| 2004/0188150 | A1 | 9/2004 | Richard et al. |
| 2007/0063876 | A1* | 3/2007 | Wong ............................... 341/34 |
| 2010/0188361 | A1 | 7/2010 | Kim et al. |
| 2011/0096005 | A1* | 4/2011 | Kim et al. ...................... 345/173 |
| 2011/0096017 | A1* | 4/2011 | Li et al. ......................... 345/174 |
| 2011/0099805 | A1* | 5/2011 | Lee ................................... 29/846 |
| 2011/0156930 | A1* | 6/2011 | Chen et al. ...................... 341/33 |

(Continued)

FOREIGN PATENT DOCUMENTS

| KR | 10-2010-0086882 A | 8/2010 |
| KR | 10-2010-0091497 A | 8/2010 |
| KR | 1020100117854 A | 11/2010 |

*Primary Examiner* — Hoa C Nguyen
(74) *Attorney, Agent, or Firm* — McKenna Long & Aldridge LLP

(57) ABSTRACT

The present invention relates to a touch panel comprising a conductive pattern having improved transmittance and concealing property, and the touch panel according to the present invention can have an effect of improvement in transmittance, a concealing property, and uniformity, and a reduction in strength of a diffraction pattern by reflection light in a conductive pattern by providing the conductive patterns comprising regions having different aperture ratios on both surfaces of a transparent substrate at predetermined positions, or laminating the transparent substrate having the conductive patterns comprising the regions having different aperture ratios.

19 Claims, 9 Drawing Sheets

(56) References Cited

U.S. PATENT DOCUMENTS

| | | | |
|---|---|---|---|
| 2011/0256307 A1* | 10/2011 | Kim et al. | 427/79 |
| 2011/0304578 A1* | 12/2011 | Kim et al. | 345/174 |
| 2012/0001863 A1* | 1/2012 | Kim et al. | 345/174 |
| 2012/0273336 A1* | 11/2012 | Kuriki | 200/600 |
| 2012/0312677 A1* | 12/2012 | Kuriki | 200/600 |

\* cited by examiner

<Case where electric uniformity is not considered>

<Case where electric uniformity is ensured through line breakage of cross points>

Aperture ratio

Position

Aperture ratio

Position

<Case where reinforced glass is attached>

<Case where reinforced glass is not attached>

Deviation of transmittance of
region A-B to region A or region B : 1%

TOUCH PANEL COMPRISING CONDUCTIVE PATTERN

TECHNICAL FIELD

This application is a Continuation Bypass Application of International Patent Application No. PCT/KR2012/007800, filed Sep. 27, 2012, which claims priority from Korean Patent Application No. 10-2011-0097753, filed Sep. 27, 2011, in the Korean Intellectual Property Office, both of which are incorporated herein by reference in its entirety.

The present invention relates to a touch panel comprising a conductive pattern.

BACKGROUND ART

In general, a display device refers to monitors for a TV or a computer as a whole, and comprises a display device forming an image and a case supporting the display device.

Examples of the display device may comprise a plasma display panel (PDP), a liquid crystal display (LCD), an electrophoretic display, and a cathode-ray tube (CRT). An RGB pixel pattern for implementing an image and an additional optical filter may be provided in the display device.

The optical filter may comprise at least one of a reflection prevention film preventing the light that is incident from the outside from being reflected to the outside, a near IR shield film shielding the near IR generated in the display device in order to prevent mis-operation of electronic devices such as remote controllers, a color correction film increasing the color purity by controlling a color tone by comprising a color control dye, and an electromagnetic wave shield film shielding the electromagnetic wave generated in a display device when a display apparatus is driven. Here, the electromagnetic wave shield film comprises a transparent substrate and a metal mesh pattern provided on the substrate.

Meanwhile, with regard to the display apparatus, as the spread of IPTVs is accelerated, a demand for a touch function that uses hands as a direct input apparatus without a separate input apparatus such as remote controllers is growing. In addition, a multi-touch function for recognizing a specific point and taking notes is required.

The touch panel performing the aforementioned function may be classified into the following types according to detection manner of a signal.

That is, examples thereof comprise a resistive type detecting a position pressed by pressure in a state where a direct voltage is applied while changing a current or voltage value, a capacitive type using capacitance coupling in a state where an alternating voltage is applied, an electromagnetic type detecting a selected position in a state where a magnetic field is applied as a change in voltage, and the like.

Among them, the resistive type and capacitive type touch panels that are most extensively spread recognize the touch by a change in electric contact or capacitance by using the transparent conductive film such as the ITO film. However, since the transparent conductive film has high resistance of 100 ohms/square or more, the sensitivity is lowered when the display device is manufactured in a large scale, and as the size of screen is increased, the cost of the ITO film is rapidly increased, accordingly, it is not easy to perform commercialization thereof. In order to overcome this, there is an effort to implement enlargement by using a metal pattern having high conductivity.

In the case of a known transparent conductor comprising ITO and a transparent conductor comprising a conductive pattern and a metal line, a dummy pattern for implementing uniform transmittance on one surface has been introduced, precise alignment and lamination of a metal line, a metal line between constitutional elements of each touch panel have been ensured, or the transparent conductive film on the one surface, in which line breakage is introduced within a predetermined ratio, has been implemented in order to overcome a problem of visibility according to a transmittance difference of a transparent conductive film constituting a touch panel. However, this method has problems in that a loss of transmittance occurs due to the presence of an additional region not providing a large electric affection, it is difficult to ensure precision of alignment in the case where a fine line is introduced (10 μm or less and the like), and transmittance is reduced when two transparent conductive films are laminated by maintaining a predetermined pitch and closing ratio on the one surface in order to ensure uniformity of the one surface.

DISCLOSURE

Technical Problem

Therefore, the present invention has been made in an effort to maximize transmittance, a concealing property, uniformity, and the like of a conductive pattern, thus improving the transmittance, the concealing property, the uniformity, and the like of a touch panel comprising the same.

Technical Solution

An exemplary embodiment of the present invention provides a touch panel comprising: a first conductive substrate comprising a first transparent substrate and a first conductive pattern provided on the first transparent substrate, and a second conductive substrate comprising a second transparent substrate and a second conductive pattern provided on the second transparent substrate in a laminate form, wherein the first conductive pattern comprises regions A and B having different aperture ratios having a difference of 0.5% or more therebetween, the second conductive pattern comprises region C overlapping the region A and region D overlapping the region B, and a difference between a product of the aperture ratio of the region A and the aperture ratio of the region C and a product of the aperture ratio of the region B and the aperture ratio of the region D is 2% or less.

Another exemplary embodiment of the present invention provides a touch panel comprising: a transparent substrate, a first conductive pattern provided on one surface of the transparent substrate, and a second conductive pattern provided on the other surface of the transparent substrate, wherein the first conductive pattern comprises regions A and B having different aperture ratios having a difference of 0.5% or more therebetween, the second conductive pattern comprises region C overlapping the region A and region D overlapping the region B, and a difference between a product of the aperture ratio of the region A and the aperture ratio of the region C and a product of the aperture ratio of the region B and the aperture ratio of the region D is 2% or less.

Advantageous Effects

A touch panel according to the present invention can have an effect of improvement in transmittance, a concealing property, and uniformity, and a reduction in strength of a diffraction pattern by reflection light of a conductive pattern by providing the conductive patterns comprising regions having different aperture ratios on both surfaces of a transparent substrate at predetermined positions, or laminating the transparent substrate having the conductive patterns comprising the regions having different aperture ratios.

BEST MODE

Hereinafter, the present invention will be described in detail.

An exemplary embodiment of a touch panel according to the present invention comprises: a first conductive substrate comprising a first transparent substrate and a first conductive pattern provided on the first transparent substrate, and a second conductive substrate comprising a second transparent substrate and a second conductive pattern provided on the second transparent substrate in a laminate form, wherein the first conductive pattern comprises regions A and B having different aperture ratios having a difference of 0.5% or more therebetween, the second conductive pattern comprises region C overlapping the region A and region D overlapping the region B, and a difference between a product of the aperture ratio of the region A and the aperture ratio of the region C and a product of the aperture ratio of the region B and the aperture ratio of the region D is 2% or less.

Another exemplary embodiment of a touch panel according to the present invention comprises: a transparent substrate, a first conductive pattern provided on one surface of the transparent substrate, and a second conductive pattern provided on the other surface of the transparent substrate, wherein the first conductive pattern comprises regions A and B having different aperture ratios having a difference of 0.5% or more therebetween, the second conductive pattern comprises region C overlapping the region A and region D overlapping the region B, and a difference between a product of the aperture ratio of the region A and the aperture ratio of the region C and a product of the aperture ratio of the region B and the aperture ratio of the region D is 2% or less.

Figure 1:
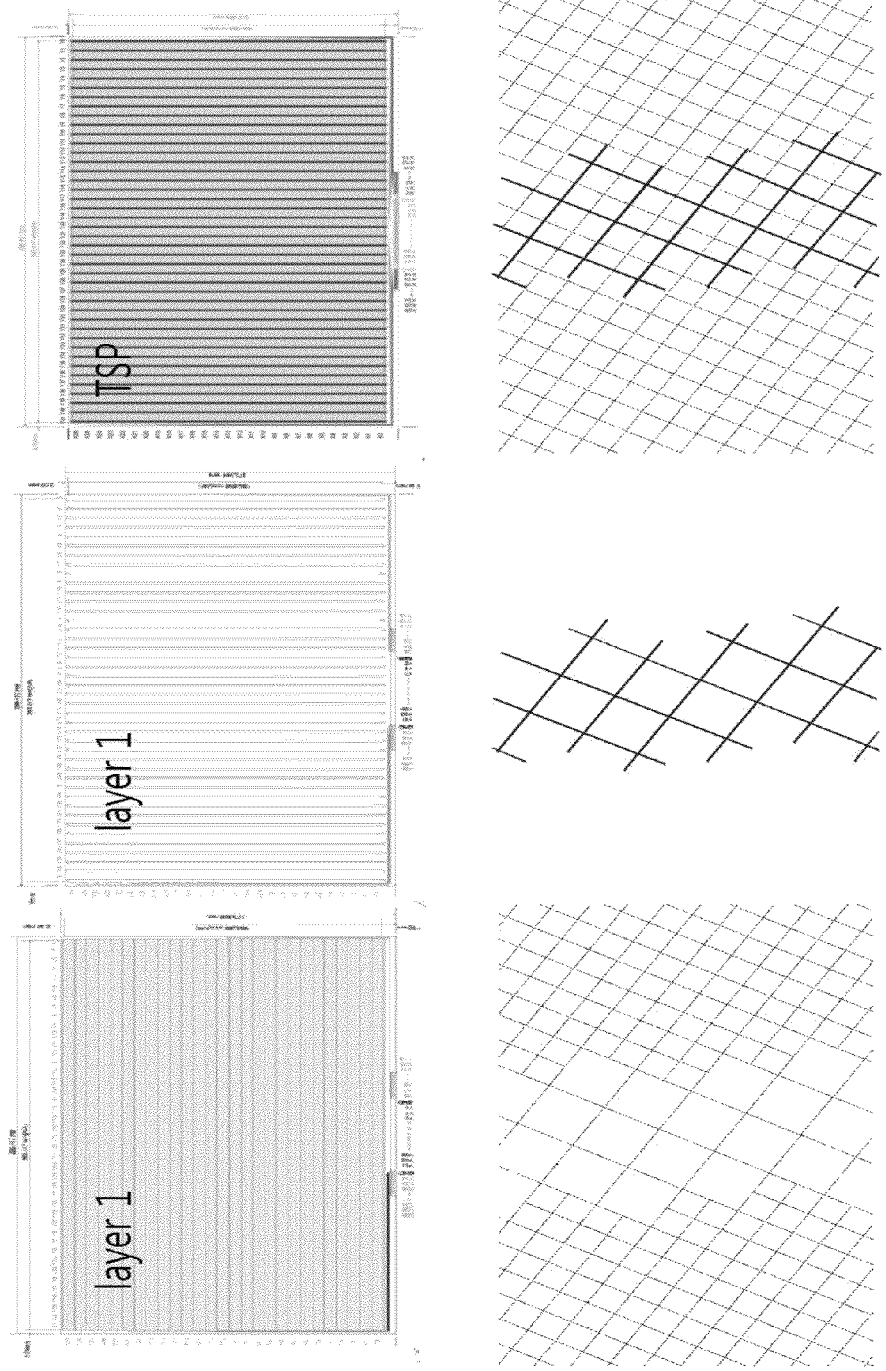
FIG. 1 is an exemplary embodiment of the present invention, and is a view showing a first conductive substrate, a second conductive substrate, and a touch panel comprising the first conductive substrate and the second conductive substrate in a lamination form.

The present invention has focused uniformity and transmittance of the touch panel manufactured in practice unlike a known method in order to solve the aforementioned problems. Therefore, in the present invention, in views of a user, when the patterns like FIG. 1 are introduced on upper and lower surfaces constituting the touch panel or both surfaces of the transparent substrate and then laminated, a pattern is designed so that uniform and high transmittance is exhibited in order to ensure uniformity and transmittance. The designing and introduction of the pattern of this method are different from a known invention in that the patterns are positioned to be separated from each other on different layers based on transmittance and uniformity of the touch panel or uniformity of transmittance is adjusted through addition of the pattern unlike a known method of maintaining constitution and transmittance of an electric circuit through line breakage of a pattern.

FIG. 1 shows a view of the touch panel having a mesh shape, to which the present invention is applied. The present invention mainly describes that when the touch panel is constituted, different layers (different surfaces of a single layer) are introduced into the mutually reflected pattern like FIG. 1 in order to improve transmittance, uniformity, and transmittance, and is advantageous in that when the touch panel is constituted through a lamination process and the like, a uniform resulting matter having improved transmittance can be finally obtained. In this case, in the case where the regular patterns are introduced into different surfaces, it is preferable that an angle of the mesh be 45° for both sides in order to avoid a moire.

That is, in the touch panel according to the present invention, when the first conductive pattern and the second conductive pattern are laminated, since one mesh pattern is formed, the same mesh rotational angle may be ensured.

The present invention may be applied to areas of various sizes in any region in the touch panel as well as the form like FIG. 1, and in this case, overall uniformity and transmittance of the finally manufactured touch panel may be ensured, and the present invention does not largely affect any pitch having a predetermined size.

Figure 2:
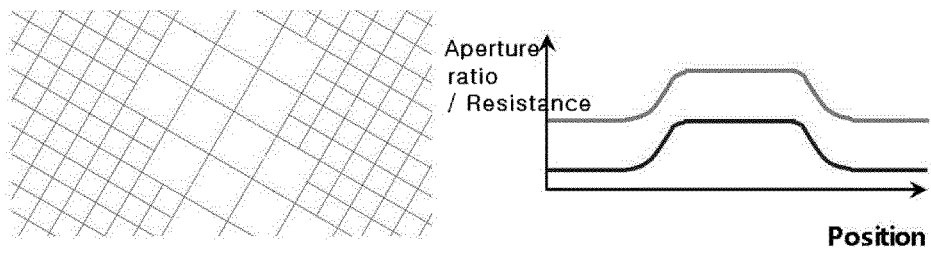
FIG. 2 is the exemplary embodiment of the present invention, and is a view showing conductive patterns in the case where electric uniformity is not considered and in the case where electric uniformity is ensured through line breakage of cross points.
Figure 2:
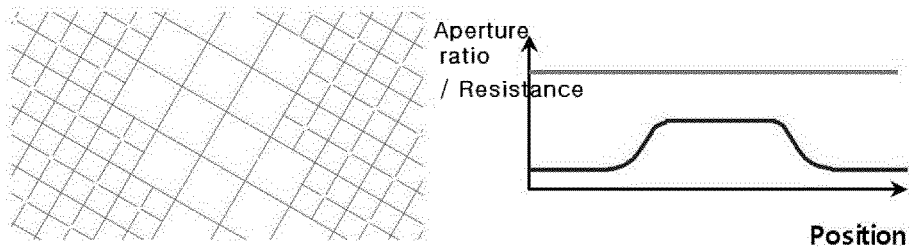

Another factor that may be considered in the present invention is uniformity of resistances. In view of uniformity of resistances, the pattern having the shape like FIG. 2 can be designed by more developing the shape like FIG. 1, and in the case where this method is used, all of the overall resistance uniformity, pattern uniformity, and transmittance may be satisfied. To be more specific, FIG. 2 is an example, to which a line breakage method of an irregular pattern is applied, and is a view showing a pattern in the case where electric uniformity is not considered and a pattern in the case where electric uniformity is ensured through line breakage of cross points.

In the touch panel according to the present invention, the difference between the aperture ratios of region A and region B may be 0.5% or more, 0.75% or more, 1% or more, 1.25% or more, and 1.5% or more.

In the touch panel according to the present invention, the difference between the product of the aperture ratio of region A and the aperture ratio of region C and the product of the aperture ratio of region B and the aperture ratio of region D may be 2% or less, 1% or less, and 0.5% or less.

Particularly, the aperture ratios of region A and region B may be different from each other by 1.5% or more, and the difference between the product of the aperture ratio of region A and the aperture ratio of region C and the product of the aperture ratio of region B and the aperture ratio of region D may be 0.5% or less.

Figure 3:
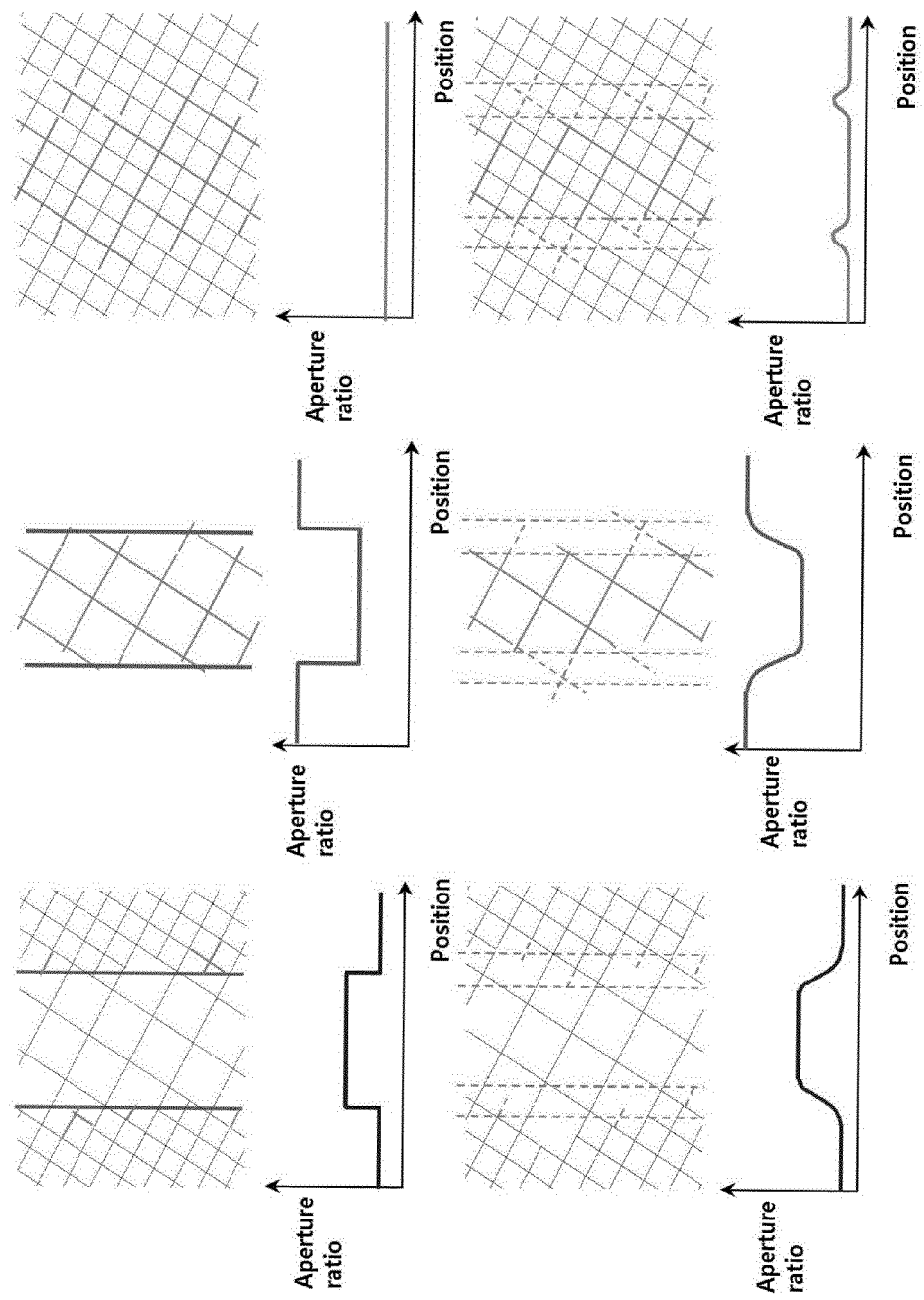
FIG. 3 is the exemplary embodiment of the present invention, and is a view showing aperture ratios for positions and a sum of the aperture ratios in the case where the conductive patterns are unilaterally divided according to a region and in the case where an additional region having another aperture ratio between regions having different aperture ratios is provided.

Another factor that may be considered in the present invention is that region AB and region CD that are a pattern design region for maximally concealing a boundary portion of the patterns when the patterns present on two different surfaces are laminated may be comprised in different surfaces. To this end, in the present invention, region AB and region CD that are an additional pattern region for minimizing a deviation between the aperture ratios like a lower portion of FIG. 3 may be introduced. FIG. 3 shows a sum of the aperture ratios when lamination is precisely performed without an error in the case where the pattern is unilaterally divided according to the region and in the case where an aperture ratio gradient is provided by providing region AB and region CD that are the additional pattern region for concealing the boundary portion.

Figure 4:
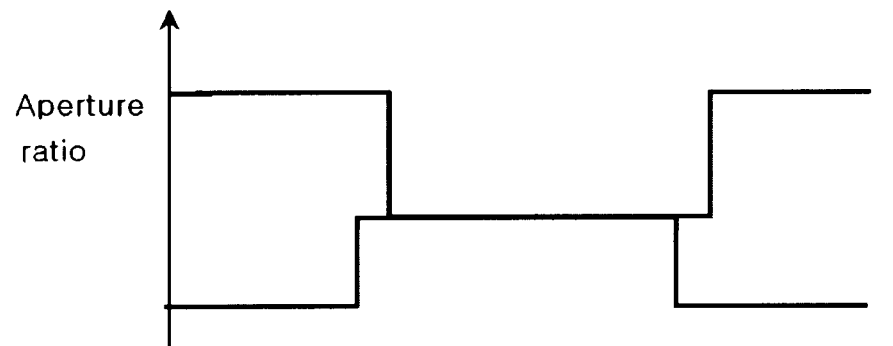
FIG. 4 is the exemplary embodiment of the present invention, and is a view showing the sum of the aperture ratios by lamination tolerance according to the position in the case where the conductive patterns are unilaterally divided according to the region.
Figure 4:
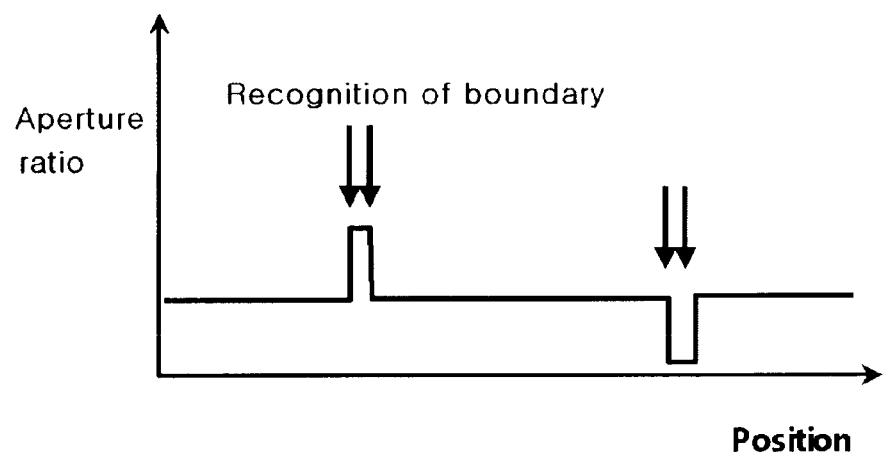
Figure 5:
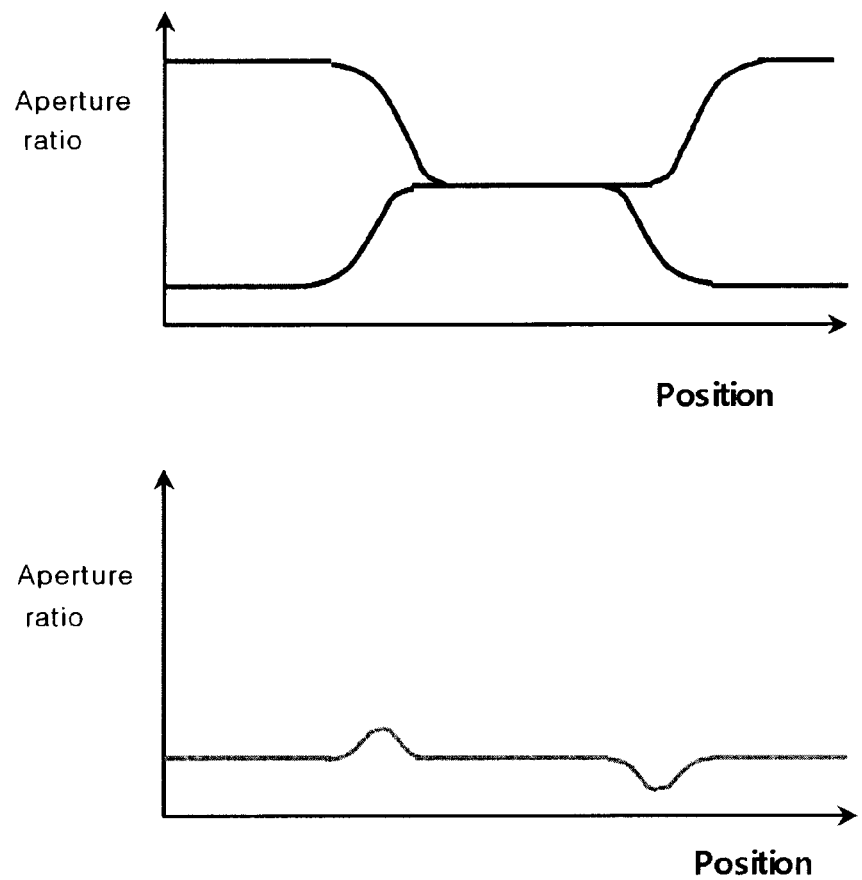
FIG. 5 is the exemplary embodiment of the present invention, and is a view showing the sum of the aperture ratios by lamination tolerance according to the position in the case where the additional region having another aperture ratio between regions having different aperture ratios in the conductive pattern is provided.
Figure 6:
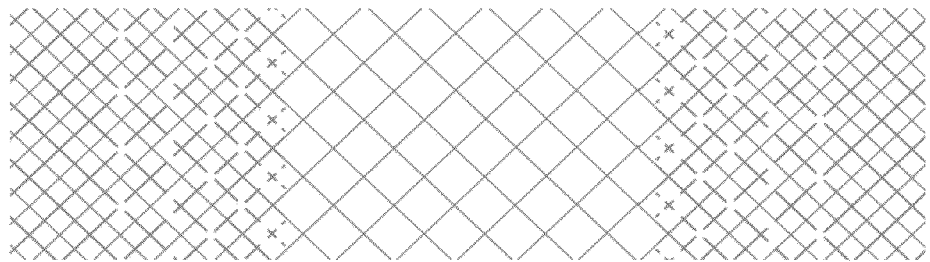
FIG. 6 is the exemplary embodiment of the present invention, and is a view showing the aperture ratio for the shape and the position of the conductive pattern in the case where the additional region having another aperture ratio between the regions having the different aperture ratios in the conductive pattern is provided.
Figure 6:
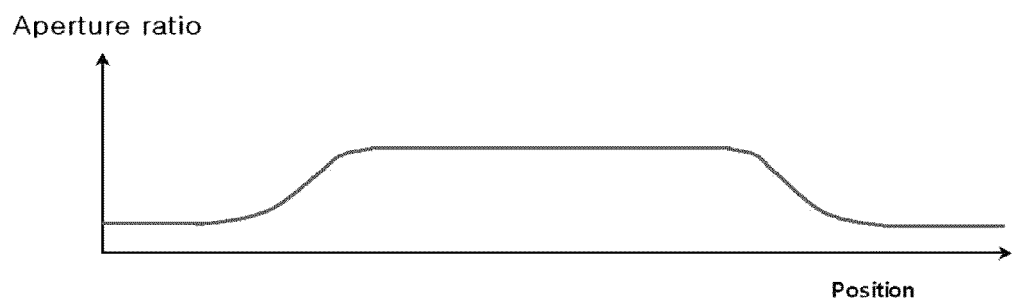
Figure 6:
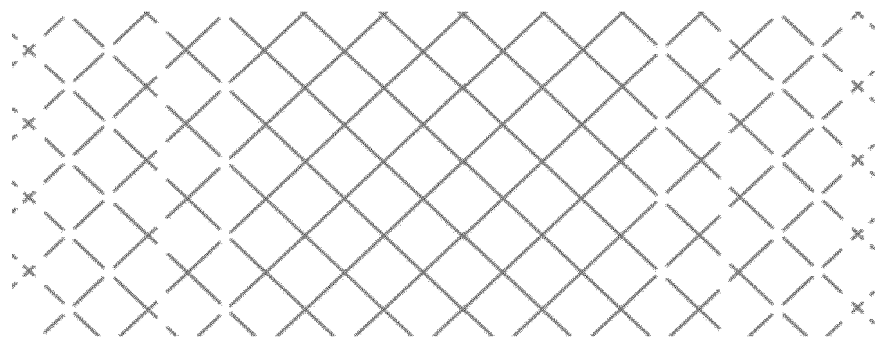
Figure 6:
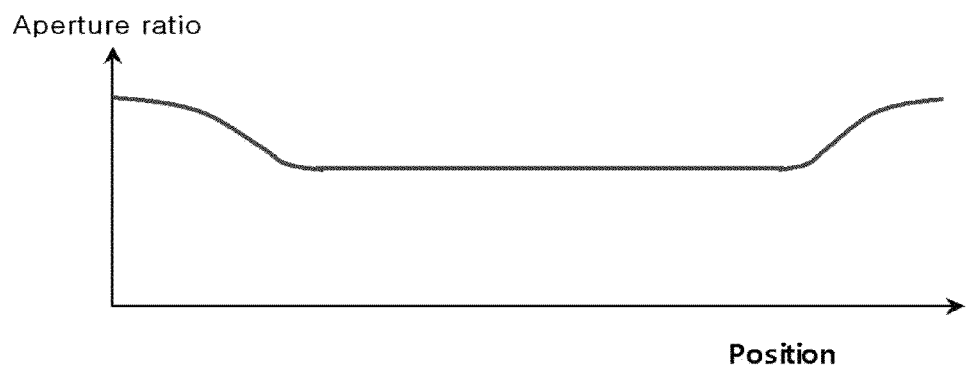

As confirmed from FIG. 3, in the case where the precise lamination is performed, the case where the additional region is not provided may exhibit the relatively more uniform aperture ratio. However, in general, the lamination process is a process comprising a process error of several to several tens micrometers between processes, and in the case where lamination tolerance occurs, as shown in FIGS. 4 and 5 in two aforementioned cases, a shift of a graph of the aperture ratio for position occurs, thus, the graph of the sum of the aperture ratios is shown like a right portion thereof. In the two cases, referring to the graph of the sum of the aperture ratios, in the case where the aperture ratio gradient is not provided, a region exhibiting a relatively steep difference between the aperture ratios is present, thus causing recognition of the boundary to allow persons to recognize the boundary region. On the other hand, in the case where the aperture ratio gradient is provided, since the aperture ratio is gradually increased and reduced, definition of the boundary is not largely exhibited, which is a better method in view of concealing of the boundary.

That is, in the touch panel according to the present invention, the aperture ratios of region AB and region CD that are the region between region A and region B and the region between region C and region D, respectively, may each have a value between the aperture ratios of two regions. Further, the aperture ratio of the interfacial region may have a gradient gradually changed in a direction from any one region to another region.

In the touch panel according to the present invention, the first conductive pattern further comprises region AB, and region AB may be provided between region A and region B and have an aperture ratio between the aperture ratio of region A and the aperture ratio of region B.

In the touch panel according to the present invention, the second conductive pattern further comprises region CD, and region CD may be provided between region C and region D, overlap region AB, and have an aperture ratio between the aperture ratio of region C and the aperture ratio of region D.

A difference between a product of the aperture ratio of region AB and the aperture ratio of region CD and a product of the aperture ratio of region A and the aperture ratio of region C may be 1% or less and is preferably 0.5% or less, but is not limited thereto.

A difference between a product of the aperture ratio of region AB and the aperture ratio of region CD and a product of the aperture ratio of region B and the aperture ratio of region D may be 1% or less and is preferably 0.5% or less, but is not limited thereto.

Region A and region B of the first conductive pattern, and region C and region D of the second conductive pattern each comprise an effective screen portion of the touch panel, and 90% or more of the effective screen portion of the touch panel may have an aperture ratio deviation of 1% or less, and has preferably the aperture ratio deviation of 0.5% or less, but the aperture ratio deviation is not limited thereto.

Region A, region B, and region AB of the first conductive pattern, and region C, region D, and region CD of the second conductive pattern each comprise the effective screen portion of the touch panel, and 90% or more of the effective screen portion of the touch panel may have the aperture ratio deviation of 1% or less, and has preferably the aperture ratio deviation of 0.5% or less, but the aperture ratio deviation is not limited thereto.

A difference between surface resistances of region A and region B of the first conductive pattern may be 20% or less, 10% or less, and 5% or less. The surface resistance may be appropriately adjusted through line breakage of the region having high density of the conductive pattern among region A and region B.

Further, a difference between surface resistances of region C and region D of the second conductive pattern may be 20% or less, 10% or less, and 5% or less. The surface resistance may be appropriately adjusted through line breakage of the region having high density of the conductive pattern among region C and region D.

Further, in the present invention, since the patterns are separated on different layers, it is confirmed that widths of region AB and region CD can be defined. That is, since two different patterns are spatially separated, even though lamination is maximally precisely performed in the case where a printing substrate is thick, in view of the boundary region, an additional overlapping region is formed due to different spaces where the patterns are present, which means that the degree of pattern concealing property depends on a viewing direction (viewing angle). In order to minimize this portion, in the present invention, calculation is performed by applying the case where the regions providing the aperture ratio gradient through the additional region AB and region CD are different.

First, considering the case where the touch panel is attached to reinforced glass through OCA (the same refractive index as that of PET), in the case of the internal metal pattern, only light having an angle of 73.3° or more is observed from PET to reinforced glass by a total reflection condition, and in this case, the length of the region where overlapping occurs is obtained by calculation of (OCA+PET) thickness×3.33. Therefore, in the case where the thickness of PET is 125 μm and the thickness of OCA is 100 μm, the aperture ratio gradient is provided to the region ranging from the overlapping pattern as the center to both sides of about 750 μm.

Figure 7:
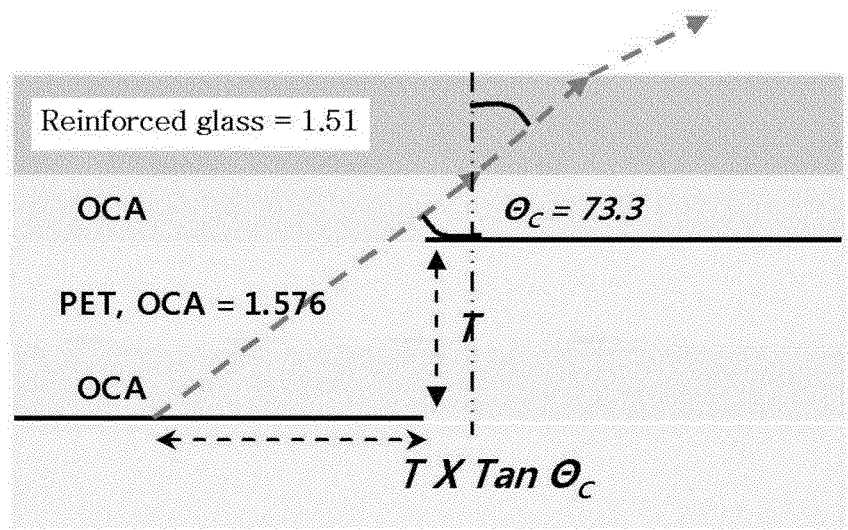
FIG. 7 is the exemplary embodiment of the present invention, and is a view showing the a difference between the areas of the additional region according to a total reflection condition when the additional region having another aperture ratio between the regions having the different aperture ratios in the conductive pattern is provided in the case where reinforced glass is attached and in the case where reinforced glass is not attached.
Figure 7:
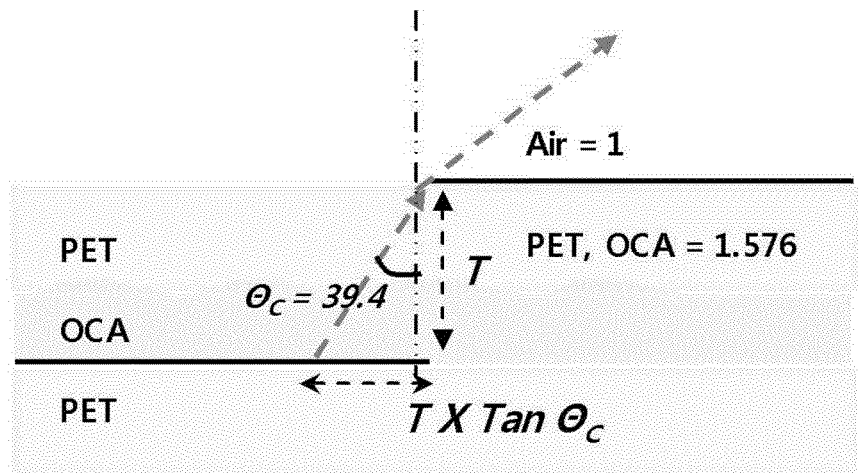

In the case where the film is used as the touch panel as another example, since a critical angle is 39.4°, the region ranging from the overlapping pattern as the center to both sides of about 185 μm (225×0.8214) μm is introduced as the region for providing the aperture ratio gradient. This relationship is a Relationship Equation under the assumption that the refractive index of OCA is basically the same as that of PET, and there is a difference in that in the case where OCA has the different refractive index, the critical angle is defined at an interface between PET and OCA according to the refractive index value of the PET substrate and OCA. However, in the case where the critical total reflection angle is defined, in the generalized Equation, the relationship of thickness/tan θc of the substrate is maintained. FIG. 7 shows a mimetic view for the reason why the aperture ratio gradient and the additional region are changed in the case where reinforced glass is attached and in the case where reinforced glass is not attached when OCA has the same refractive index as the PET substrate.

Therefore, to sum it up, in the case where the touch panel is manufactured through glass and OCA of 100 μm on the substrate having the thickness of 125 μm, the size of region AB and region CD that are the region for the additional aperture ratio gradient is preferably 750 μm or more, but is not limited thereto.

Further, in the present invention, when the patterns provided on different layers are laminated in practice, a recognition property of the pattern by the difference between the aperture ratios is apprehended by designing the pattern having various line widths and pitches in order to confirm the difference between the aperture ratios, which is not visually recognized by people. As a result, in the case where the aperture ratios are the same while there is a difference between the line widths, the difference between the immediately adjacent line widths is not largely recognized within 1 μm, but it is apprehended that in the case where the line width is larger than 1 μm, the difference is easily recognized. When the mesh having the line width of 3 μm and the pitch of 300 μm is set to a standard as an example thereof, it is confirmed that in the mesh having the line width of 2 μm and 4 μm and the pitch of 300, the line widths are not largely differentiated based on 3 μm, but the difference is easily seen with regard to 5 μm.

Therefore, through this, it can be confirmed that in the present invention, it is more preferable that the line widths of the patterns positioned on different surfaces be the same as each other if possible. On the other hand, in the case where the aperture ratios are different while the line widths are the same, when the difference between the aperture ratios for each line width is within 1%, it is difficult to recognize the difference, and when the difference between the aperture ratios is 0.543 (based on transmittance of 0.5%) or less, the difference is hardly recognized. Therefore, it is confirmed that it is very important to maintain the difference between the products of the aperture ratios of each region at 1% or less and preferably 0.543% or less.

Figure 9:
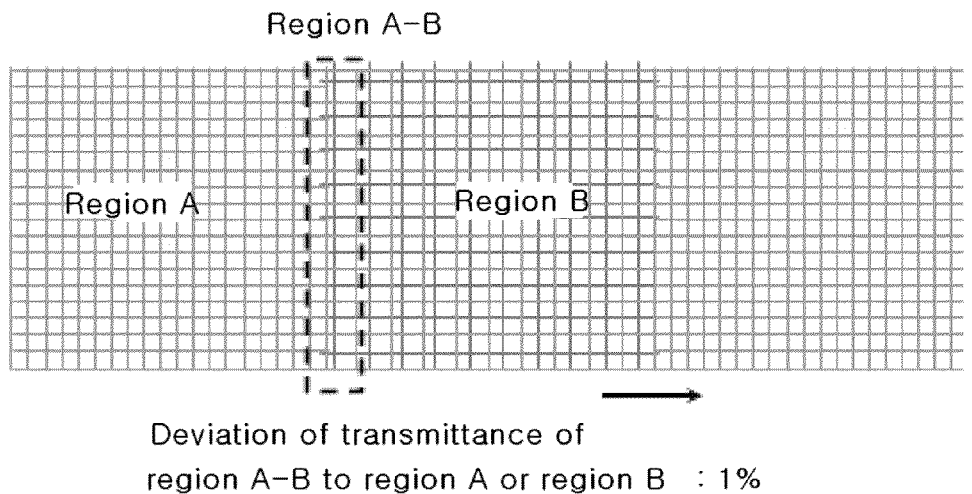
Figure 9:
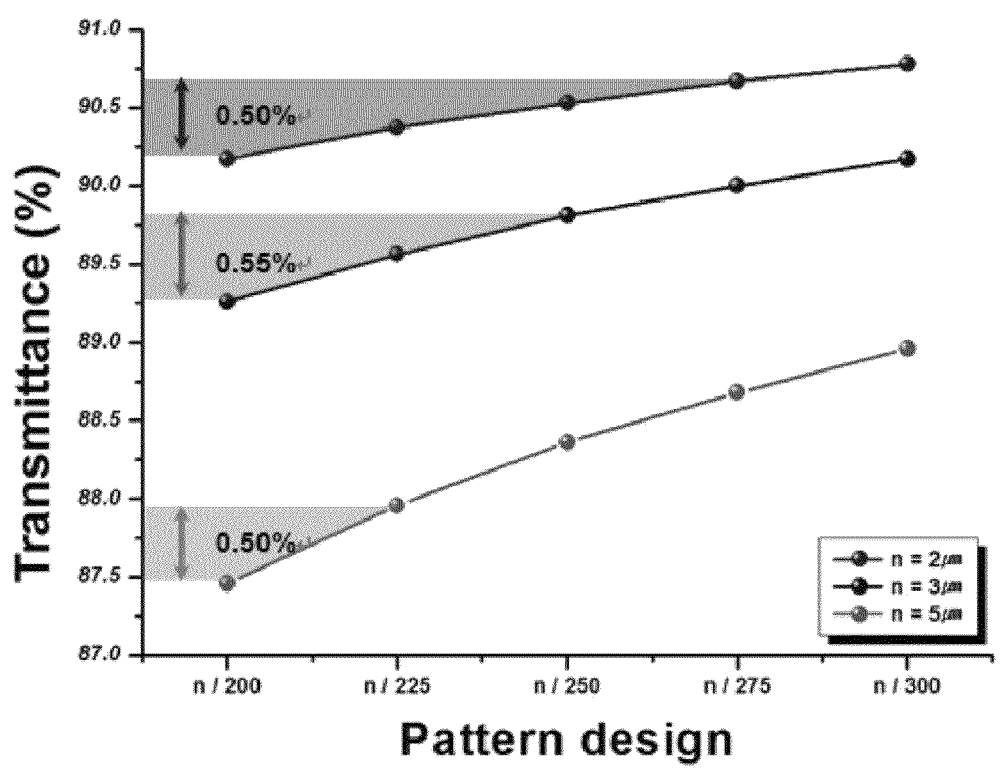

FIG. 9 shows the degree of recognition by the person according to the difference between the aperture ratios with regard to the line width of 2 μm, 3 μm and 5 μm. FIG. 9 shows a region where the difference between the regions corresponding to the difference in transmittance, which is represented by a color, is hardly recognized visually, and in the case where the region moves while maintaining the same difference according to the graph, the same result is exhibited.

Figure 8:
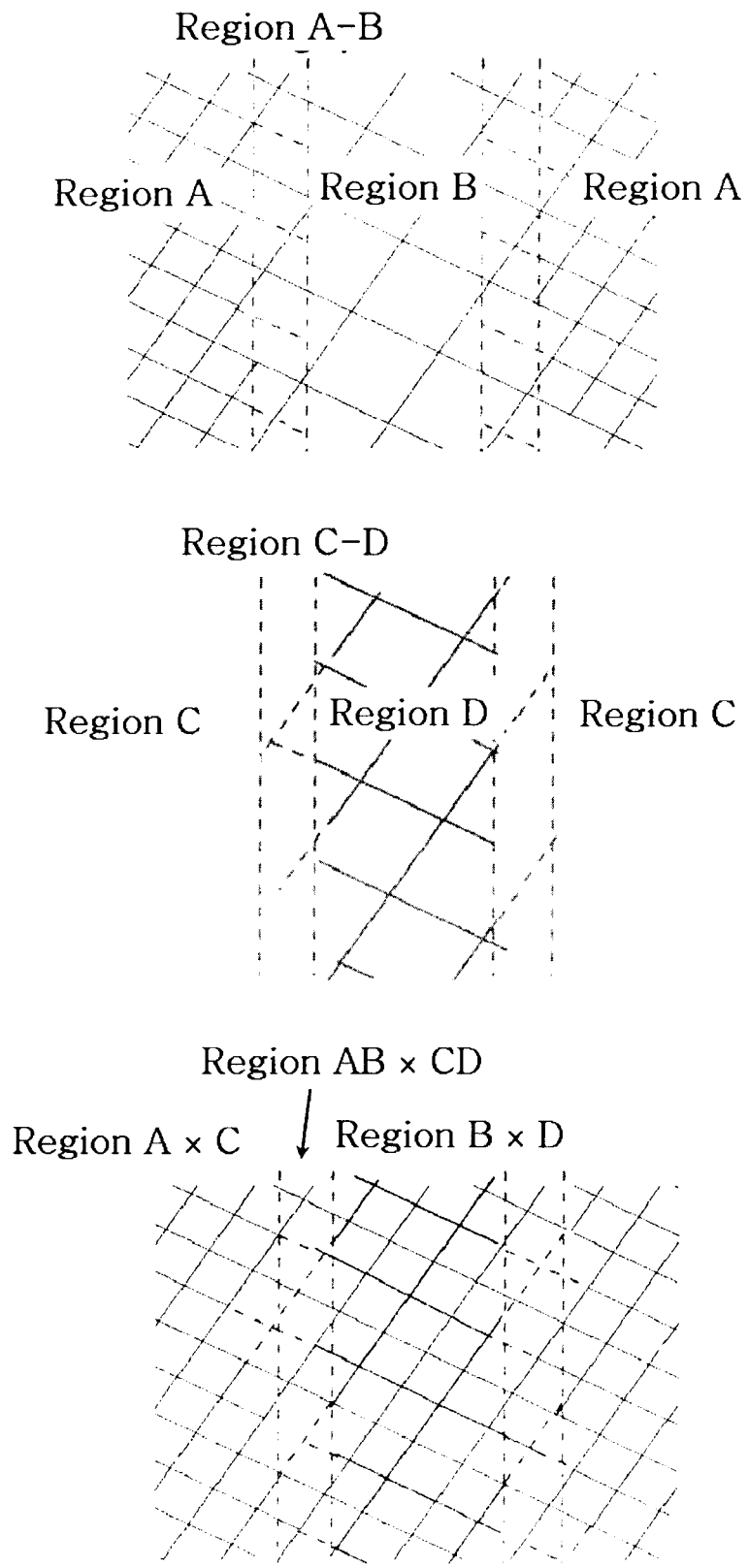
FIGS. 8 and 9 are the exemplary embodiment of the present invention, and views showing examples of division of the region of the conductive pattern.

Therefore, to sum it up, since the present invention mainly describes that uniformity of the aperture ratios is basically ensured in view of the touch panel, in the case where the region is divided like FIG. 8 (the case of the aperture ratio gradient region may be divided, but for the convenience of understanding, the region having a very large difference between the aperture ratios is first divided), the case satisfying all of the following Relationship Equations 1 to 3 is most preferable.

(Aperture ratio of region $A$×aperture ratio of region $C$)−(Aperture ratio of region $B$×aperture ratio of region $D$)<1  [Relationship Equation 1]

(Aperture ratio of region $A$×aperture ratio of region $C$)−(Aperture ratio of region $AB$×aperture ratio of region $CD$)<1  [Relationship Equation 2]

(Aperture ratio of region $C$×aperture ratio of region $D$)−(Aperture ratio of region $AB$×aperture ratio of region $CD$)<1  [Relationship Equation 3]

In Relationship Equations 1 to 3, the aperture ratio represents a % value as a ratio of the opened region to the entire region.

The first conductive pattern and the second conductive pattern may comprise the pattern formed of a conductive metal line. The pattern formed of the conductive metal line may comprise a closed curve formed of a straight line, a curved line, or the straight line and the curved line.

The first conductive pattern and the second conductive pattern may be a regular pattern or an irregular pattern.

A pattern shape of the art, such as a mesh pattern, may be used as the regular pattern. The mesh pattern may comprise a regular polygonal pattern comprising one or more shapes of a triangle, a quadrangle, a pentagon, a hexagon, and an octagon.

In the exemplary embodiment of the present invention, the first conductive pattern and the second conductive pattern are a regular pattern and comprise cross points formed by crossing a plurality of predetermined lines among lines constituting the conductive pattern, and in this case, the number of cross points may be 3,000 to 122,500, 13,611 to 30,625, and 19,600 to 30,625 in an area of 3.5 cm×3.5 cm. Further, according to the exemplary embodiment of the present invention, when the pattern is provided in a display, it is confirmed that an optical property of the display is not largely spoiled in the case where the number of cross points is 4,000 to 123,000.

Further, in the exemplary embodiment of the present invention, the first conductive pattern and the second conductive pattern are the irregular pattern and comprise cross points formed by crossing a plurality of predetermined lines among the lines constituting the conductive pattern, and in this case, the number of cross points may be 6,000 to 245,000, 3,000 to 122,500, 13,611 to 30,625, and 19,600 to 30,625 in an area of 3.5 cm×3.5 cm. Further, according to the exemplary embodiment of the present invention, when the pattern is provided in the display, it is confirmed that the optical property of the display is not largely spoiled in the case where the number of cross points is 4,000 to 123,000.

The pitchs of the first conductive pattern and the second conductive pattern may be 600 μm or less and 250 μm or less, but the pitch may be adjusted according to transmittance and conductivity required by the person with ordinary skill in the art.

The first conductive pattern and the second conductive pattern used in the present invention are appropriately a material having specific resistance of $1×10^6$ to $30×10^6$ ohm·cm, and more preferably $7×10^6$ ohm·cm or less.

In the present invention, the first conductive pattern and the second conductive pattern may be the irregular pattern.

The irregular pattern comprises an edge structure of continuously connected closed figures, the closed figures having the same shape are not present in a predetermined irregular unit area (1 cm×1 cm), and the number of vertexes of the closed figures may be different from the number of vertexes of the quadrangles having the same number as the closed figures. More specifically, the number of vertexes of the closed figures may be larger than or 1.9 to 2.1 times larger than the number of vertexes of the quadrangles having the same number as the closed figures, but is not limited thereto.

The closed figures are continuously connected to each other, and for example, in the case where the closed figures are polygons, the adjacent closed figures may have a shape sharing at least one side.

The irregular pattern comprises the edge structure of continuously connected closed figures, the closed figures having the same shape are not present in a predetermined unit area (1 cm×1 cm) in the irregular pattern, and the number of vertexes of the closed figures may be different from the number of vertexes of the polygon formed by connecting shortest distances between centers of gravity of the closed figures. More specifically, the number of vertexes of the closed figures may be larger than or 1.9 to 2.1 times larger than the number of vertexes of the polygons formed by connecting the shortest distances between centers of gravity of the closed figures, but is not limited thereto.

The irregular pattern comprises the edge structure of the continuously connected closed figures, the closed figures having the same shape are not present in a predetermined unit area (1 cm×1 cm) in the irregular pattern, and a value of the following Equation 1 may be 50 or more in the closed figures.

(Standard deviation of distances between the vertexes/ Average of the distances between the vertexes)× 100  [Equation 1]

The value of Equation 1 may be calculated in the unit area of the conductive pattern. The unit area may be an area where the conductive pattern is formed, and, for example, 3.5 cm×3.5 cm and the like, but is not limited thereto.

In the present invention, the vertex means a point at which the lines constituting the edge of the closed figures of the conductive pattern cross each other.

The irregular pattern may have a shape of the edge structure of the closed figures obtained by after disposing predetermined points in regularly arranged unit cells, connecting the points to the closest points thereto as compared to the distances from other points.

In this case, in the case where randomness is introduced into a manner where predetermined points are disposed in the regularly arranged unit cells, the irregular pattern may be formed. For example, in the case where randomness is provided as 0, if the unit cell is a square, the conductive pattern has a square mesh structure, and if the unit cell is a regular hexagon, the conductive pattern has a honeycomb structure. That is, the irregular pattern means a pattern where randomness is not 0.

A leaning phenomenon and the like of lines constituting the pattern may be suppressed, uniform transmittance may be obtained from the display, the linear density to the unit area may be maintained as the same value, and uniform conductivity may be ensured by the conductive pattern having the irregular pattern shape according to the present invention.

In the present invention, the materials of the first conductive pattern and the second conductive pattern are not particularly limited, but are preferably metal. It is preferable that the materials of the first conductive pattern and the second conductive pattern have excellent conductivity and be easily etched.

In the present invention, even though the material having the total reflectance of 70 to 80% or more is used, it is possible to decrease the total reflectance, decrease visibility of the electric conductive pattern, and maintain or improve a contrast property.

Specific examples of the materials of the first conductive pattern and the second conductive pattern preferably comprise a single film or a multilayered film comprising gold, silver, aluminum, copper, neodymium, molybdenum, nickel, or an alloy thereof. Herein, the thickness of a first conductive pattern and a second conductive pattern is not particularly limited, but is preferably 0.01 to 10 μm in terms of conductivity of the conductive pattern and economic efficiency of the forming process thereof.

The forming of the first conductive pattern and the second conductive pattern may adopt a method using an etching resist pattern. The etching resist pattern may be formed by using a printing method, a photolithography method, a photography method, a method using a mask, or laser transferring, for example, thermal transfer imaging, and the printing method or photolithography method is more preferable. The electric conductive pattern may be etched by using the etching resist pattern, and the etching resist pattern may be removed.

In the present invention, the line widths of the first conductive pattern and the second conductive pattern may be 10 μm or less, 7 μm or less, 5 μm or less, 4 μm or less, 2 μm or less, or 0.1 μm or more. To be more specific, the line widths of the first conductive pattern and the second conductive pattern may be 0.1 to 1 μm, 1 to 2 μm, 2 to 4 μm, 4 to 5 μm, 5 to 7 μm, or the like, but are not limited thereto.

Further, the line widths of the first conductive pattern and the second conductive pattern may be 10 μm or less and the thicknesses thereof may be 10 μm or less, the line widths of the first conductive pattern and the second conductive pattern may be 7 μm or less and the thicknesses thereof may be 1 μm or less, or the line widths of the first conductive pattern and the second conductive pattern may be 5 μm or less and the thicknesses thereof may be 0.5 μm or less.

To be more specific, in the present invention, the line widths of the first conductive pattern and the second conductive pattern may be 10 μm or less, and in the first conductive pattern and the second conductive pattern, the number of vertexes of the closed figures in the area of 3.5 cm×3.5 cm may be 6,000 to 245,000. Further, the line widths of the first conductive pattern and the second conductive pattern may be 7 μm or less, and in the first conductive pattern and the second conductive pattern, the number of vertexes of the closed figures in the area of 3.5 cm×3.5 cm may be 7,000 to 62,000. Further, the line widths of the first conductive pattern and the second conductive pattern may be 5 μm or less, and in the first conductive pattern and the second conductive pattern, the number of vertexes of the closed figures in the area of 3.5 cm×3.5 cm may be 15,000 to 62,000.

The aperture ratio of the first conductive pattern and the second conductive pattern, that is, the ratio of the area not covered by the pattern, may be 70% or more, 85% or more, and 95% or more. In addition, the aperture ratios of the first conductive pattern and the second conductive pattern may be 90 to 99.9%, but are not limited thereto.

The first conductive pattern and the second conductive pattern used in the present invention are appropriately a material having specific resistance of $1 \times 10^6$ to $30 \times 10^6$ ohm·cm, and more preferably $7 \times 10^6$ ohm·cm or less.

The first conductive pattern and the second conductive pattern may comprise the mesh pattern, and region A and region D may have different mesh rotational angles.

In the present invention, the transparent substrate is not particularly limited, but it is preferable to use the substrate where the light transmittance is 50% or more, and preferably 75% or more. Specifically, glass may be used as the transparent substrate, and the plastic substrate or the plastic film may be used. A material known in the art may be used as the plastic substrate or film, and for example, a material formed of one or more resins selected from polyacryls, polyurethanes, polyesters, polyepoxys, polyolefines, polycarbonates, and celluloses may be used. To be more specific, it is preferable to use the film having the visible ray transmittance of 80% or more, such as PET (polyethylene terephthalate), PVB (polyvinylbutyral), PEN (polyethylene naphthalate), PES (polyethersulfone), PC (polycarbonate), and acetyl celluloid. The thickness of the plastic film is preferably 12.5 to 500 µm, more preferably 50 to 450 µm, and even more preferably 50 to 250 µm. The plastic substrate may be a substrate having a structure in which various functional layers such as a gas barrier layer for blocking moisture and gas on one surface or both surfaces of the plastic film, a hard coat layer for compensating strength, and a low reflection layer for improving reflectance are laminated. The functional layer that can be comprised in the plastic substrate is not limited thereto, and various functional layers may be provided.

In the present invention, it is preferable to use the metal having excellent electric conductivity as the material of the conductive pattern. In addition, the specific resistance value of the conductive pattern material is preferably 1 microOhm cm or more and 100 microOhm cm or less. Copper, silver, gold, iron, nickel, aluminum, titanium, oxides and nitrides thereof, and the like may be used while being mixed as specific examples of the conductive pattern material, and it is preferable to use aluminum, and oxides and nitrides thereof together in terms of cost.

Particularly, in the present invention, metal having excellent electric conductivity may be used as the conductive pattern material to implement excellent sensitivity of the touch panel, low power driving caused by a rapid response speed, and flexible touch due to high softness of metal.

In the present invention, in order to form a desired pattern on each layer, it is possible to form the precise electric conductive pattern having the small line width on the transparent substrate by using a printing method, a photolithography method, a photography method, a method using a mask and the like. The printing method may be performed by using a method in which the paste or ink comprising the electric conductive pattern material is transferred on the transparent substrate in the desired pattern form and then sintered. The printing method is not particularly limited, and a printing method such as offset printing, screen printing, gravure printing, flexo printing, inkjet printing, and nano imprint may be used, and one or more complex methods among the methods may be used. The printing method may adopt a roll to roll method, roll to plate, plate to roll, or plate to plate method.

In the present invention, it is preferable to apply a reverse offset printing method in order to implement the precise electric conductive pattern. To this end, in the present invention, a method where ink that can be used as a resist during etching is applied on an entire surface of a silicon-based rubber called a blanket, an unnecessary portion is removed through an intaglio on which a pattern called a first cliché is formed, a printing pattern remaining on the blanket is secondly transferred on a film or a substrate such as glass on which metal and the like are deposited, and a desired pattern is formed through sintering and etching processes may be performed. In the case where this method is used, there is a merit in that resistance in a thickness direction can be uniformly maintained because uniformity of line heights is ensured over the entire region by using the substrate on which metal is deposited. In addition to this, the present invention may comprise a direct printing method where conductive ink such as Ag ink is directly printed by using the aforementioned reverse offset printing method and then sintered to form a desired pattern. In this case, the line heights of the pattern may be made uniform by printing pressure, and conductivity may be provided by a heat sintering process for the purpose of connecting Ag nanoparticles due to inter-surface fusion, a microwave sintering process a laser partial sintering process, or the like.

In the present invention, it is not limited to the aforementioned printing method, and the photolithography process may be used. For example, the photolithography process may be performed by using the method in which the electric conductive pattern material layer is formed on the entire surface of the transparent substrate, the photoresist layer is formed thereon, the photoresist layer is patterned by the selective exposure and developing processes, the electric conductive pattern is patterned by using the patterned photoresist layer as the etching resist, and the photoresist layer is removed.

The present invention may adopt the photolithography method. For example, after the picture photosensitive material comprising silver halide is applied on the transparent substrate, the pattern may be formed by selective exposing and developing processes of the photosensitive material. A detailed example will be described below. First, the photosensitive material for negative is applied on the substrate on which the pattern will be formed. In this case, a polymer film such as PET and acetyl celluloide may be used as the substrate. The polymer film material on which the photosensitive material is applied is called the film herein. The photosensitive material for negative may be formed of silver halide in which AgBr that is very sensitive to light and regularly reacted therewith and a small amount of AgI were mixed with each other. Since the image developed by picturing the general photosensitive material for negative is a negative picture that is opposite to the subject in terms of light and shade, the picturing may be performed by using the mask having the pattern form that will be formed and preferably an irregular pattern form.

Plating treatment may be further performed in order to increase conductivity of the conductive pattern formed by using the photolithography and photography processes. The plating may adopt an electroless plating method, copper or nickel may be used as the plating material, and after copper plating is performed, nickel plating may be performed thereon, but the scope of the present invention is not limited thereto.

The present invention may adopt the method using the mask. For example, patterning may be performed by depositing the conductive pattern material on the substrate after the mask having the desired conductive pattern form is disposed to be close to the substrate.

In this case, the depositing method may adopt a heat deposition method by heat or electron beam, a PVD (physical vapor deposition) method such as sputter, and a CVD (chemical vapor deposition) method using an organometal material.

As described above, a touch panel according to the present invention can improve transmittance, a concealing property, uniformity, and the like of a conductive pattern by providing the conductive patterns comprising regions having different aperture ratios on both surfaces of a transparent substrate at predetermined positions, or laminating the transparent substrate having the conductive patterns comprising the regions having different aperture ratios.

The invention claimed is:

1. A touch panel comprising:
   a first conductive substrate comprising a first transparent substrate and a first conductive pattern provided on the first transparent substrate, and
   a second conductive substrate comprising a second transparent substrate and a second conductive pattern provided on the second transparent substrate in a laminate form,
   wherein the first conductive pattern comprises regions A and B having different aperture ratios having a difference of 0.5% or more therebetween, the second conductive pattern comprises region C overlapping the region A and region D overlapping the region B, and a difference between a product of the aperture ratio of the region A and the aperture ratio of the region C and a product of the aperture ratio of the region B and the aperture ratio of the region D is 2% or less.

2. The touch panel of claim 1, wherein the aperture ratios of the region A and the region B are different from each other by 1.5% or more, and the difference between the product of the aperture ratio of the region A and the aperture ratio of the region C and the product of the aperture ratio of the region B and the aperture ratio of the region D is 0.5% or less.

3. The touch panel of claim 1, wherein the first conductive pattern further comprises region AB, and the region AB is provided between the region A and the region B, and has an aperture ratio between the aperture ratio of the region A and the aperture ratio of the region B.

4. The touch panel of claim 3, wherein the second conductive pattern further comprises region CD, and the region CD is provided between the region C and the region D, overlaps the region AB, and has an aperture ratio between the aperture ratio of the region C and the aperture ratio of the region D.

5. The touch panel of claim 3, wherein the difference between the product of the aperture ratio of the region AB and the aperture ratio of the region CD and the product of the aperture ratio of the region A and the aperture ratio of the region C is 1% or less.

6. The touch panel of claim 3, wherein the difference between the product of the aperture ratio of the region AB and the aperture ratio of the region CD and the product of the aperture ratio of the region B and the aperture ratio of the region D is 1% or less.

7. The touch panel of claim 3, wherein the region A, the region B, and the region AB of the first conductive pattern and the region C, the region D, and the region CD of the second conductive pattern each comprise the effective screen portion of the touch panel, and 90% or more of the effective screen portion of the touch panel has the aperture ratio deviation of 1% or less.

8. The touch panel of claim 1, wherein the region A and the region B of the first conductive pattern and the region C and the region D of the second conductive pattern each comprise an effective screen portion of the touch panel, and 90% or more of the effective screen portion of the touch panel has an aperture ratio deviation of 1% or less.

9. The touch panel of claim 1, wherein a surface resistance difference between the region A and the region B of the first conductive pattern is 20% or less.

10. The touch panel of claim 1, wherein the surface resistance difference between the region C and the region D of the second conductive pattern is 20% or less.

11. The touch panel of claim 1, wherein the first conductive pattern and the second conductive pattern comprise a pattern formed of a conductive metal line.

12. The touch panel of claim 11, wherein the pattern formed of the conductive metal line comprises a closed curve formed of a straight line, a curved line, or the straight line and the curved line.

13. The touch panel of claim 1, wherein the first conductive pattern and the second conductive pattern comprise a regular or irregular pattern.

14. The touch panel of claim 1, wherein the first conductive pattern and the second conductive pattern comprise a mesh pattern.

15. The touch panel of claim 14, wherein the region A and the region D have different mesh rotational angles.

16. The touch panel of claim 1, wherein the first conductive pattern and the second conductive pattern comprise an edge structure of continuously connected closed figures, the closed figures having the same shape are not present in a predetermined unit area (1 cm×1 cm) in the first conductive pattern and the second conductive pattern, and the number of vertexes of the closed figures is different from the number of vertexes of quadrangles having the same number as the closed figures.

17. The touch panel of claim 1, wherein the first conductive pattern and the second conductive pattern comprise the edge structure of continuously connected closed figures, the closed figures having the same shape are not present in a predetermined unit area (1 cm×1 cm) in the first conductive pattern and the second conductive pattern, and the number of vertexes of the closed figures is different from the number of vertexes of a polygon formed by connecting shortest distances between centers of gravity of the closed figures.

18. The touch panel of claim 1, wherein the first conductive pattern and the second conductive pattern comprise the edge structure of continuously connected closed figures, the closed figures having the same shape are not present in a predetermined unit area (1 cm×1 cm) in the first conductive pattern and the second conductive pattern, and a value of the following Equation 1 is 50 or more in the closed figures:

$$\text{(Standard deviation of distances between vertexes/Average of distances between vertexes)} \times 100. \quad \text{[Equation 1]}$$

19. A touch panel comprising:
   a transparent substrate,
   a first conductive pattern provided on one surface of the transparent substrate, and
   a second conductive pattern provided on the other surface of the transparent substrate,
   wherein the first conductive pattern comprises regions A and B having different aperture ratios having a difference of 0.5% or more therebetween, the second conductive pattern comprises region C overlapping the region A and region D overlapping the region B, and a difference between a product of the aperture ratio of the region A and the aperture ratio of the region C and a product of the aperture ratio of the region B and the aperture ratio of the region D is 2% or less.

* * * * *